United States Patent [19]

Gagne

[11] Patent Number: 4,540,361

[45] Date of Patent: Sep. 10, 1985

[54] ENHANCED PNEUMATIC REGENERATOR FLOW CONTROL

[75] Inventor: Robert Gagne, New Kensington, Pa.

[73] Assignee: PPG Industries, Inc., Pittsburgh, Pa.

[21] Appl. No.: 575,092

[22] Filed: Jan. 30, 1984

[51] Int. Cl.[3] .......................... F24H 7/00; F27D 17/00
[52] U.S. Cl. .......................................... 432/30; 165/1;
165/DIG. 11; 432/181
[58] Field of Search .................... 432/30, 180, 181;
165/1, 9.3, DIG. 11

[56] References Cited

U.S. PATENT DOCUMENTS

| | | | |
|---|---|---|---|
| 1,703,460 | 2/1929 | Scott | 432/181 |
| 4,195,780 | 4/1980 | Inglis | 417/187 |
| 4,328,020 | 5/1982 | Hughes | 65/27 |
| 4,372,770 | 2/1983 | Krumwiede et al. | 65/27 |
| 4,375,235 | 3/1983 | Tsai | 165/1 |
| 4,375,236 | 3/1983 | Tsai | 165/1 |

OTHER PUBLICATIONS

"Transvector Air Flow Amplifiers", Vorted Corporation, Cincinnati, Ohio, (1974).
"Jet-Flo Transducer", Jet-Flo Division, Union Flonetics Corporation, Imperial, PA.
"Jetflow 100 Airmover," Olin Energy Systems, Ltd., Sunderland, England.

Primary Examiner—John J. Camby
Attorney, Agent, or Firm—Dennis G. Millman

[57] ABSTRACT

Pneumatic control of flow patterns in regenerators is improved by the use of flow amplifier nozzles.

22 Claims, 5 Drawing Figures 4,540,361

ENHANCED PNEUMATIC REGENERATOR FLOW CONTROL

BACKGROUND OF THE INVENTION

This invention relates to the control of flow in the regenerator chambers of a regenerative combustion furnace. In particular the invention relates to regenerative furnaces in which the combustion chamber communicates with each regenerator by means of a plurality of spaced-apart ports such as the type commonly employed in the melting of glass.

The regenerators used in such furnaces contain a bed of refractory material, such as a stacked arrangement of bricks sometimes called "checker packing," provided with passages for the alternate passing of exhaust gases and combustion air. During the exhaust phase of the combustion cycle, exhaust gases pass through the regenerator bed to heat the packing. In alternate phases of the firing cycle the flow is reversed, and the heat stored in the packing is transferred to combustion air passing through the regenerator to the furnace. The regenerators are generally employed in pairs whereby one regenerator is absorbing heat from the exhaust gas while the other is heating incoming air.

In a conventional, unpartitioned, multiport regenerator, the ports communicate with a common plenum at one side of the regenerator bed, and at the opposite side of the regenerator bed another common plenum communicates with a flue. at one end thereof. The flow of gases to and from the regenerator is by way of the flue, which because of its asymmetrical location has been found to lead to unbalanced gas flows through the regenerator bed. During the exhaust phase of the firing cycle hot exhaust gases from the ports tend to be drawn toward the flue end of the regenerator, and greater quantities of the exhaust gas pass through the packing at the flue end than at the opposite end of the regenerator. Conversely, during the firing phase of the cycle, relatively cool incoming combustion air passing into the regenerator tends to flow to the far end of the regenerator and pass in greater quantities through the packing at that end of the regenerator than at the flue end of the regenerator. As a result, the flue end of the portion of the packing tends to reach higher peak temperatures as well as maintaining higher minimum temperatures over the firing cycle. Because of the high temperatures, the flue end portion of the packing tends to deteriorate faster than others, thereby shortening furnace life and often acting as a restriction on the operation of a furnace. Furthermore, because the stored heat is concentrated in one portion of the packing, the efficiency with which air is preheated during the firing phase is reduced, thereby reducing the overall thermal efficiency of the furnace.

A number of proposals have been made to overcome this problem. An effective and practical solution is disclosed in U.S. Pat. No. 4,375,236 of Yih-Wan Tsai wherein pneumatic jets are employed to alter the flow patterns in a regenerator. In that arrangement, jets in the plenum communicating with the flue are directed in the direction of the flue so as to counter the tendency of excessive amounts of combustion air to travel to the far end of the plenum during the firing phase. During the exhaust phase, the same jets create a low pressure zone that draws additional exhaust gas through the opposite end of the regenerator packing from the flue, thereby countering the tendency to overheat the flue end of the packing. Similarly, a jet may be used in the other plenum communicating with the ports to control the flow dynamics in the regenerator in the manner taught in U.S. Pat. No. 4,375,235 of Yih-Wan Tsai. In the latter arrangement, the jet or jets are situated near the flue end of the plenum and are directed toward the opposite end of the regenerator.

A somewhat different aspect of regenerator flow control is treated in U.S. patent application Ser. No. 510,807 filed July 5, 1983 by Edward P. Savolskis entitled "Port Wall Air Jet for Controlling Combustion Air," and U.S. patent application Ser. No. 510,808 filed July 5, 1983 by Yih-Wan Tsai entitled "Target Wall Air Jet for Controlling Combustion Air." The concepts in these applications involve jets associated with the ports, and although they may be employed to alter flow patterns in the regenerators to some extent, their primary purpose is to control flow through the ports and, in particular, to adjust the distribution of flows among the ports.

The use of pneumatic jets to control flows in regenerators and ports is highly advantageous because of the relatively low cost and the ease with which they may be installed on existing furnaces. Also, the jets can be readily installed without disruption to operating furnaces. The operating expense of providing compressed air to the jets is usually outweighed by the savings in fuel and the cost benefits of extending regenerator life, but it would be desirable to lower the operating costs of the jets to make their use even more economically attractive. Accordingly, it is an object of the present invention to reduce the compressed air consumption of pneumatic jet type flow control means in regenerative furnaces.

Another application of gas jets in regenerative furnaces is for the injection of reactants into the exhaust gas stream for treating pollutants. For example, in U.S. Pat. Nos. 4,328,020 and 4,372,770, ammonia is injected by a carrier jet of compressed air into a glass furnace regenerator to reduce nitric oxides. Economizing on compressed air use in this type of process would likewise be advantageous.

SUMMARY OF THE INVENTION

In the present invention, pneumatic control of regenerator and port flow patterns is achieved economically by the use of flow amplifier nozzles. A flow amplifier nozzle employs a relatively small volume, high velocity stream of gas to entrain a much larger volume of gas, thereby producing an amplified total flow. Such nozzles are characterized by a supersonic jet of gas issuing from a narrow slit and being passed as a thin film along a surface of the nozzle. It has been found that using an amplified gas stream can yield regenerator flow control equivalent to that attained by use of an ordinary jet while consuming substantially less compressed air than the ordinary jet.

THE DRAWINGS

DETAILED DESCRIPTION

Figure 1:
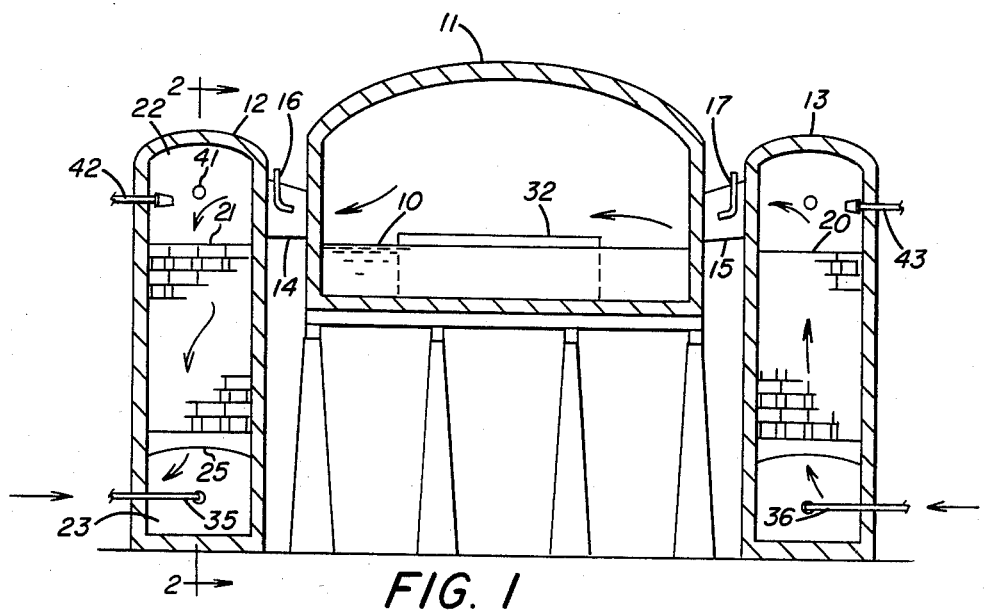
FIG. 1 is a schematic, transverse, vertical section across the width of a crossfired, regenerative, glass melting furnace showing several examples of flow control nozzle placements that may be utilized with the present invention.

The regenerative furnace shown in the drawings is typical of the melting furnaces used in the flat glass industry. It should be understood that such a furnace is being described as an illustrative example, and that the invention is applicable to regenerative furnaces of other types.

In FIG. 1 a pool of molten and partially melted glass 10 is contained in a melter 11, the interior of which is the main combustion chamber of the furnace. The furnace also includes a pair of regenerators 12 and 13 flanking the melter and which communicate with the melter by means of a plurality of burner ports 14 and 15. Fuel for combustion is supplied by fuel lines 16 and 17, respectively, to burners inserted into each port. As shown in FIG. 1, the regenerator 12 is in the exhaust phase of the firing cycle and the regenerator 13 is in the firing phase of the firing cycle. Air for combustion passes upwardly through regenerator 13, where it is preheated by passing over a previously heated gas pervious brickwork checker packing 20 made of refractory materials, and then passes through ports 15 where it combines with fuel from fuel line 17 at the mouth of each port. Flames issue a considerable distance into the interior of the melter 11, and hot exhaust gases pass through the ports 14 and into the opposite regenerator 12 where the exhaust gases heat another brickwork checker packing 21. Fuel line 16 is inoperative during this portion of the firing cycle. After several minutes of operation the flows are reversed, fuel is supplied through lines 16, and fuel lines 17 are inactivated. During this second phase of the firing cycle, regenerator 12 serves to preheat incoming combustion air and regenerator 13 serves to capture waste heat from the exhaust gases passing therethrough. After several more minutes of operation, the direction of flow is reversed again, and so on.

Figure 2:
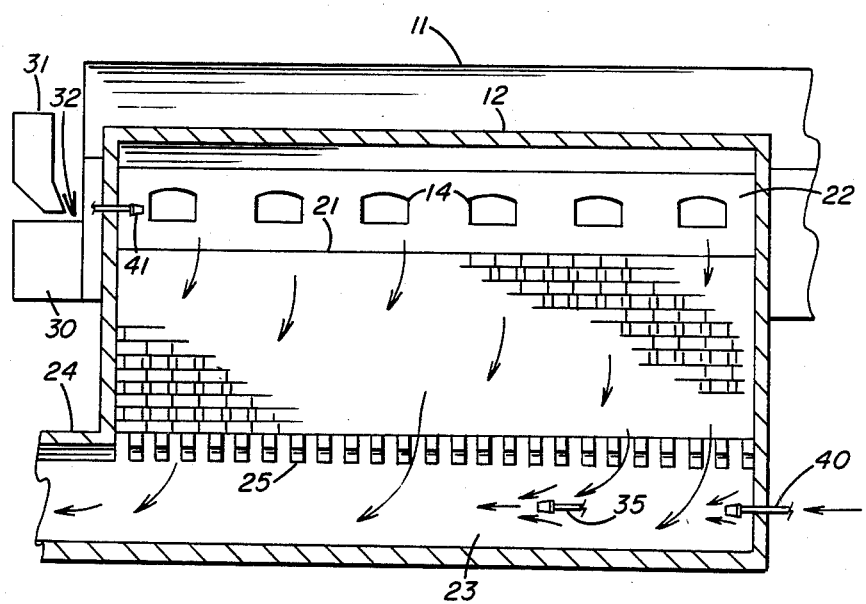
FIG. 2 is a vertical, longitudinal section of a regenerator taken along line A—A in FIG. 1 showing a typical flow pattern during an exhaust phase of the regenerator and showing examples of several flow control nozzle replacements.
Figure 3:
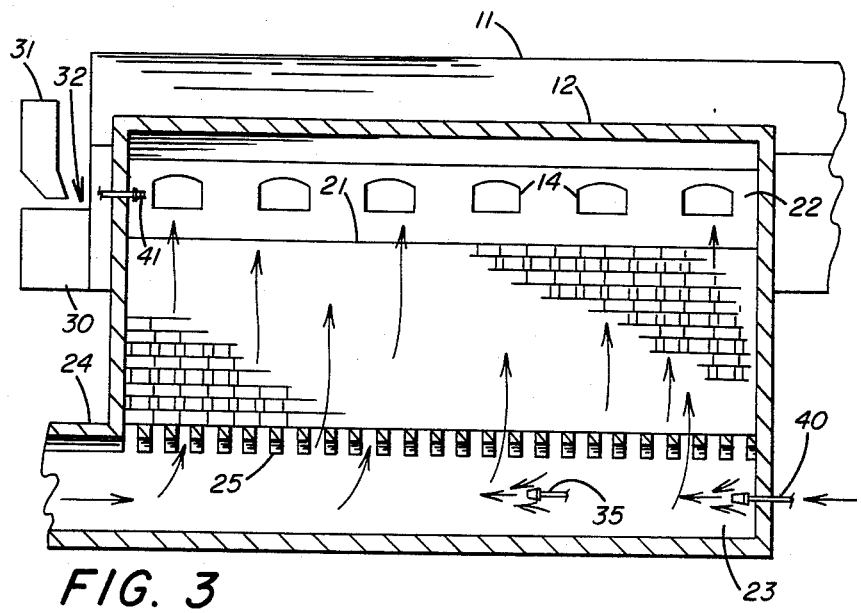
FIG. 3 is a vertical, longitudinal section of the same regenerator taken along line A—A in FIG. 1 showing a typical flow pattern during a firing phase.

Structurally, the regenerators 12 and 13 may essentially be mirror images of each other, and therefore the description of additional structural features of regenerator 12 herein applies to regenerator 13 as well. Typical of glass melting furnace regenerators is the geometry depicted in the drawings wherein the width of the bed of packing, as shown in FIG. 1, is considerably less than its length, as shown in FIGS. 2 and 3. This is due to the fact that each regenerator is in communication with an elongated row of ports, typically four to eight ports on each side of the furnace. On the port side of the packing 21 is an elongated plenum 22 by way of which each of the ports 14 are in common communication with the packing 21. At the opposite side of the packing is a second plenum 23 which opens at one end to a flue 24 (FIGS. 2 and 3). The packing may be supported by a series of arches 25. With reference to the specific embodiment illustrated, the plenum 22 may be referred to as the "upper plenum" and the plenum 23 may be referred to as the "lower plenum," but it should be understood that their relative locations are not critical to the invention and that the invention is applicable to regenerators having different orientations.

Referring to FIG. 2 or 3, there is shown a schematic representation of the batch feeding means for the melter 11. This may include an inlet extension portion 30 of the melter basin, glass batch feeding means 31, and an inlet opening 32. The flue 24 is shown at the same end of the furnace as the feeding means which is typical of flat glass melting furnaces, but it should be understood that the flue 24 could be located at the opposite end of the lower plenum 23.

In a regenerator having the general configuration described above, it has been found that certain unbalanced flow patterns exist. For example, with reference to FIG. 2, during the exhaust phase exhaust gases tend to be drawn laterally through the upper plenum 22 toward the flue end of the regenerator, causing greater amounts of gas to flow through the packing at the flue end than at the opposite end of the packing. As a result, the packing at the flue end becomes hotter than at the opposite end. Conversely, during the firing phase, with reference now to FIG. 3, incoming combustion air tends to pass in greater amounts to the far end of the lower plenum 23 from the flue 24, so that larger amounts of the combustion air pass through the far end of the packing than pass through the flue end of the packing. Therefore, the cooling affect of the combustion air is greater at the far end of the packing. As a result, the packing near the flue end has been found to remain continually at a higher temperature than the rest of the packing. This uneven heating and cooling of the packing results in inefficient heat recovery and accelerated deterioration of the packing at the flue end.

A number of pneumatic means have been proposed for correcting these flow imbalances in regenerators. A preferred mode is to employ a nozzle 35 in the lower plenum 23 which directs one or more jets of gas (preferably air) substantially parallel to the length of the lower plenum toward the flue end thereof. The nozzle 35 is preferably located in the half of the lower plenum 23 farthest from the flue 24, optimally in the farthest one-third. A corresponding nozzle 36 may be employed in the opposite regenerator 13 (FIG. 1). Referring again to FIG. 2, an auxiliary nozzle 40 may be employed to advantage in some cases, in addition to or instead of the nozzle 35. The nozzle 40 may extend through the far end wall of the lower plenum 23. Additional nozzles may be employed in the lower plenum as the need may require. The nozzles 35 and 40 produce an entrainment effect on the surrounding gases, thereby creating a low-pressure zone in the adjacent portion of the packing. This low-pressure zone induces greater flow rates of exhaust gas down through the packing at the opposite end of the flue during the exhaust phase thereby diminishing the tendency of the exhaust gas to flow along the upper plenum 22 toward the flue end of the packing. With reference to FIG. 3, jets issuing from the nozzles 35 and 40 also serve during the firing phase to resist the flow of incoming combustion air to the far end of the lower plenum 23, thereby causing larger amounts of the combustion air to pass through portions of the packing at the flue end of the regenerator. The nozzles may be operated during either or both phases of the firing cycle.

As shown in FIGS. 1, 2 and 3, a nozzle 41 may be provided at the flue end of the upper plenum 22 as an alternative or addition to the lower plenum nozzles. Operating in essentially the same manner as the lower plenum nozzles, the upper plenum nozzle 41 may be operated during either the firing phase or exhaust phase or both. Jets from nozzle 41 serve to counteract lateral flow of exhaust gases through the upper plenum 22 toward the flue end during the exhaust phase, and during the firing phase create a low-pressure region that induces greater flow of combustion air through the flue end of the packing. A plurality of nozzles may be employed in the upper plenum to assist nozzle 41.

Another use for pneumatic control in regenerative furnaces is to employ jets of gas to regulate flow through individual ports. Nozzles 42 and 43 in FIG. 1 are examples of such an application and extend through the side of the regenerator directly opposite the opening of a port onto the upper plenum. Alternatively, port flow control nozzles may extend through the walls of the port necks 14 or 15. A single port or several of the ports may be equipped with flow control nozzles. Port flow control nozzles are used primarily during the firing phase to induce greater amounts of preheated combustion air from the packing to flow through a particular port or group of ports. This can be useful in redistributing the firing rates among the several ports and in assuring an adequate degree of combustion. Port nozzles may also be employed on the exhaust side to impede flow of exhaust gas through a particular port or group of ports.

Gaseous jets are also employed in furnaces of this type to control objectionable emissions. For example, U.S. Pat. No. 4,328,020 of D. E. Hughes discloses a technique for injecting ammonia into the exhaust gases of a glass melting furnace to reduce nitric oxide emissions. Ammonia may be injected into the flue 24 with the nozzles of the present invention. Alternatively, nozzles 35 or 40 may be employed for the ammonia injection.

Figure 4:
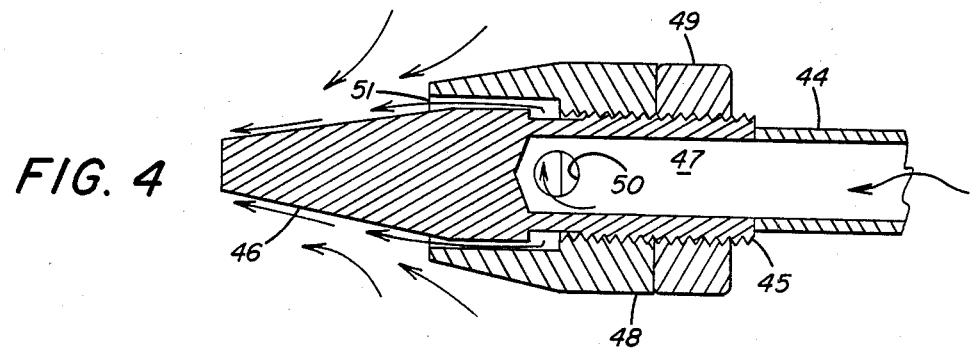
FIG. 4 is an enlarged cross-section of a flow amplifier nozzle embodiment of the present invention.

Details of a flow amplifier nozzle of a type preferred for use with the present invention may be seen in FIG. 4. The essential features of a flow amplifier nozzle are that a supersonic stream of gas is issued from a slit adjacent to a flow-directing surface, the supersonic jet flows as a film on the flow-directing surface and the jet entrains large volumes of adjacent ambient gas, thereby inducing an overall flow volume several times greater than that of the high velocity jet. Amplification of the volume flow rate is typically a factor of ten times or more. In the example of FIG. 4, a conduit 44 is in communication with a source of compressed air and is in gas tight communication with a threaded rear portion 45 of the nozzle body. The nozzle body has a tapered forward portion 46 and a central bore 47 in the rear portion in communication with the conduit 44. A threaded annular sleeve 48 is received on the threaded rear portion 45 of the nozzle body and may be locked in position by a lock nut 49 also received on the threads of the rear body portion 45. One or more transverse openings 50 communicate the central bore 47 with an annular space 51 created between the tapered body 46 and the sleeve 48. The annular space 51 is selected to provide a supersonic flow therethrough. Compressed air (or other gas) supplied by the conduit 44 passes through the bore 47 and openings 50 to the annular gap 51 from which the air or other gas escapes as an annular supersonic jet flowing along the forward surface 46, thereby entraining substantial quantities of surrounding gases.

Because of the cooling effect of the compressed gas flow on or near the surface of the nozzle of FIG. 4, the nozzle may be fabricated of mild steel. When deployed in the locations of nozzle 42 or 43 (FIG. 1) additional precautions may be necessary to obtain practical nozzle life, such as fabricating the nozzle from a more refractory metal or preferably from ceramic materials and/or maintaining a small rate of flow for the sake of cooling during the exhaust phase when the nozzle may not otherwise be in operation. The sleeve 48 is threaded onto the nozzle body portion 45 so that by turning the sleeve 48 the rate of gas flow through the openings 50 may be throttled. However, this adjustability feature is optional and the elements of the nozzle could be rigidly affixed to one another. Flow amplifier nozzles of the same general type depicted in FIG. 4 are commercially available in varying forms.

Figure 5:
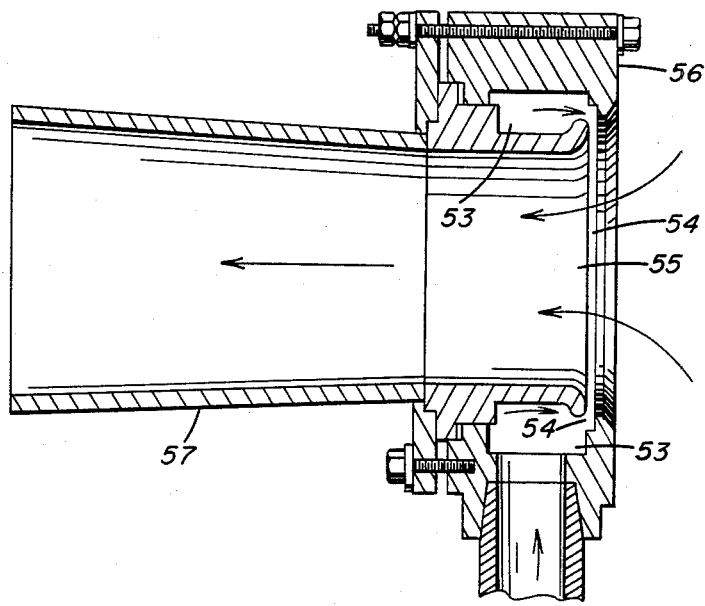
FIG. 5 is an enlarged cross-section of an alternative form of gas flow amplifier.

An alternative type of commercially available flow amplifier that may be employed with the present invention is shown in FIG. 5. Compressed air (or other gas) is supplied to an annular space 53 formed between an inner ring 55 and an outer ring 56 and escapes through a circular slit 54 between the two ring portions. An annular supersonic jet is formed by the gas escaping through the slit 54 which follows the curved inner surface of the ring 55 and the inner surface of a horn extension 57, thereby entraining large volumes of ambient gases through the central opening of the amplifier. Because of the complexity of this embodiment of flow amplifier, it may be preferred to provide a cooling jacket (not shown) in order to obtain reasonable life expectancy within a regenerator.

The pressure of the compressed air supplied to the flow control nozzles is non-critical, but a typical industrial compressed air source nominally rated at about 80 pounds per square inch is suitable. The volume flow rate will be related to the annular gap of the nozzle. Thus, an upper limit on the annular gap is dictated only by the need to economize on compressed air use. Reasonable air consumption can be attained with the annular gap in the range of 0.01 to 0.1 inches. However, at the low end of the range, the output flow rate of the nozzle may be so restricted as to be impractical for use in a large scale regenerator. Therefore, for use in a large scale system the annular gap is preferably at least 0.015 inch and most preferably, at least 0.02 inch.

EXAMPLE I

The flow effectiveness of an ordinary open-ended ½ inch inside diameter pipe was compared with a flow amplifier nozzle of the type shown in FIG. 4 and the results are shown in Table 1. The nozzle had an annular gap of 0.021 inch and a cross-sectional area of 0.0495 square inches. The velocity pressure of the air stream from the pipe and the nozzle was measured by a manometer in the center of the flow stream at a fixed point approximately 6 feet downstream from the pipe or nozzle outlet. The flow rate of compressed air supplied to the pipe or nozzle was measured by an orifice meter. The various trials of the nozzle represent different settings of the air supply orifice progressing from the most throttled setting in trial 1 to the fully open setting in trial 5. The data of Table 1 show that with less than half of the flow rate of compressed air the amplifier nozzle (particularly trial 4) closely approaches the downstream flow effect of the open-ended pipe.

TABLE I

| | Flow Rate (Standard Cubic Feet Per Minute) | Manometer (Inches Water) |
|---|---|---|
| ½ inch pipe | 87.4 | 0.38 |

TABLE I-continued

| | Flow Rate (Standard Cubic Feet Per Minute) | Manometer (Inches Water) |
|---|---|---|
| Flow Amplifier Nozzle | | |
| Trial 1 | 42 | 0.27 |
| Trial 2 | 41.8 | 0.28 |
| Trial 3 | 41.8 | 0.32 |
| Trial 4 | 42.3 | 0.36 |
| Trial 5 | 42.1 | 0.25 |

EXAMPLE II

A commercial flat glass melting furnace structured essentially as shown in FIGS. 1 through 3 and having eight ports was provided with regenerator flow control means consisting of straight pipe air jets in the lower plenum. The original jets had been found effective in reducing the regenerator packing temperatures at the flue end. The effectiveness of the flow amplifier nozzle of the type shown in FIG. 4 was tested in comparison with the straight pipe by substituting the nozzle for the pipe at various locations in the lower plenum of the furnace, and the change in the effectiveness of reducing the flue end packing temperature was noted. The results of the tests are set forth in TABLE II. In tests 1 through 11, the jets were located substantially like the nozzle 35 in FIGS. 2 and 3 in the lower plenum approximately in alignment below the port noted. In tests 12 and 13 the location was that of nozzle 40 in FIGS. 2 and 3. In all cases the flow amplifier nozzle consumed substantially less compressed air. As noted in TABLE II, negative results were reached in tests 2, 3 and 4 in that the flue end packing temperature increased. The negative result in test 2 would be expected due to the use of a smaller diameter straight pipe, and the negative results in tests 3 and 4 are apparently due to the nozzle gaps in those tests having been too small for that particular location, or due to aberrations in the furnace conditions. In the remainder of the tests the flue end temperature control with each nozzle was equivalent to that previously attained with the straight pipe even though substantially less compressed air was required. The pipe "gap" is its inside diameter.

TABLE II

| | | Location | Outlet Gap (inches) | Outlet Area (square inches) | Air Flow (standard cubic feet per hour) | Flue End Temperature Effect |
|---|---|---|---|---|---|---|
| 1. | Pipe | 4th port, left | 0.5 | 0.196 | 10,577 | |
| 2. | Pipe | " | 0.375 | 0.110 | 8,989 | Increased |
| 3. | Nozzle | " | 0.021 | 0.056 | 4,709 | Increased |
| 4. | Nozzle | " | 0.032 | 0.085 | 5,896 | Increased |
| 5. | Nozzle | " | 0.055 | 0.142 | 5,730 | Unchanged |
| 6. | Pipe | 4th port, right | 0.5 | 0.196 | 5,960 | |
| 7. | Nozzle | " | 0.055 | 0.142 | 5,301 | Unchanged |
| 8. | Pipe | 6th port, left | 0.5 | 0.196 | 3,716 | |
| 9. | Nozzle | " | 0.055 | 0.142 | 3,379 | Unchanged |
| 10. | Pipe | 6th port, right | 0.5 | 0.196 | 5,110 | |
| 11. | Nozzle | " | 0.055 | 0.142 | 4,280 | Unchanged |
| 12. | Pipe | End wall, right | 0.5 | 0.196 | 5,463 | |
| 13. | Nozzle | " | 0.021 | 0.056 | 4,212 | Unchanged |

Specific embodiments have been described herein in order to disclose the best mode of practicing the invention, but it should be understood that other variations and modifications as are known to those of skill in the art may be resorted to without departing from the scope of the invention defined by the claims which follow.

I claim:

1. A method of operating a regenerative furnace wherein gases are passed through passageways between a combustion chamber and a regenerator bed, injecting a jet of gas into a moving stream of gas in at least one of the passageways so as to affect movement of the stream and to thereby alter the flow pattern of gases between the combustion chamber and the regenerator bed, the jet being a narrow, high velocity jet discharged adjacent to a nozzle surface to flow along the surface and entrain gas within the passageway.

2. The method of claim 1 wherein the gas entrainment in the passageway is at least ten times the volume flow rate of the high velocity jet.

3. The method of claim 1 wherein the high velocity jet is at supersonic velocity.

4. The method of claim 1 wherein the jet is discharged in a passageway that comprises a plenum in communication with a plurality of ports through which gas passes between the combustion chamber and the regenerator bed.

5. The method of claim 4 wherein the jet is directed toward the port.

6. The method of claim 1 wherein the jet is discharged into at least one of a plurality of ports through which gas passes between the combustion chamber and the regenerator bed.

7. The method of claim 1 wherein the gas supplied to the jet comprises air.

8. The method of claim 1 further including melting glass in the combustion chamber.

9. The method of claim 1 wherein the high velocity jet is discharged through a slit 0.01 and 0.1 inches wide.

10. The method of claim 9 wherein the slit is annular and encircles the nozzle surface.

11. The method of claim 1 wherein a plurality of jets is discharged into the passageways to alter the flow pattern therethrough.

12. The method of claim 1 wherein the jet is discharged into a passageway in communication with the regenerator bed along one side and with a row of ports communicating with the combustion chamber, and the jet is directed transversely to the direction of gas flow through the ports.

13. A method of operating a regenerative furnace wherein gases are passed through a passageway between a flue and a regenerator bed which is in communication with a combustion chamber, injecting a jet of gas into a moving stream of gas in the passageway so as to effect movement of the stream and to thereby alter the flow pattern of gas through the regenerator bed, the jet being a narrow, high velocity jet discharged adjacent to a nozzle surface to flow along the surface and entrain gas within the passageway.

14. The method of claim 13 wherein the gas entrainment in the passageway is at least ten times the volume flow rate of the high velocity jet.

15. The method of claim 13 wherein the high velocity jet is at supersonic velocity.

16. The method of claim 13 wherein the gas jet is discharged into a passageway in communication at one end with the flue and along its length with the regenerator bed, wherein the jet is directed toward the flue.

17. The method of claim 13 wherein the gas discharged from the jet includes ammonia.

18. The method of claim 13 wherein the gas supplied to the jet comprises compressed air.

19. The method of claim 13 further including melting glass in the combustion chamber.

20. The method of claim 13 wherein a plurality of jets are discharged into the passageway to alter the flow pattern therethrough.

21. The method of claim 13 wherein the high velocity jet is discharged through a slit 0.01 to 0.1 inches wide.

22. The method of claim 21 wherein the slit is annular and encircles the nozzle surface.

* * * * *